(12) United States Patent
Levy et al.

(10) Patent No.: US 8,061,691 B2
(45) Date of Patent: Nov. 22, 2011

(54) PISTON AND GAS SPRING ASSEMBLY INCLUDING SAME

(75) Inventors: Daniel I Levy, High Beech (GB); Jonathan Hall, Slough (GB)

(73) Assignee: BFS Diversified Products, LLC, Indianapolis, IN (US)

( * ) Notice: Subject to any disclaimer, the term of this patent is extended or adjusted under 35 U.S.C. 154(b) by 961 days.

(21) Appl. No.: 12/026,289

(22) Filed: Feb. 5, 2008

(65) Prior Publication Data
US 2008/0211150 A1    Sep. 4, 2008

Related U.S. Application Data

(60) Provisional application No. 60/899,456, filed on Feb. 5, 2007.

(51) Int. Cl.
*F16F 9/04* (2006.01)

(52) U.S. Cl. ............. 267/64.27; 267/64.21; 267/64.24

(58) Field of Classification Search ............. 267/64.13, 267/64.19, 64.21, 64.23, 64.24, 64.27
See application file for complete search history.

(56) References Cited

U.S. PATENT DOCUMENTS

| 4,506,910 A | 3/1985 | Bierens |
| 6,024,343 A | 2/2000 | Ebert |
| 6,527,259 B1 | 3/2003 | Nemeth et al. |

FOREIGN PATENT DOCUMENTS

DE    42 13 676 A1    10/1993

*Primary Examiner* — Bradley King
*Assistant Examiner* — Nicholas J Lane
(74) *Attorney, Agent, or Firm* — Fay Sharpe LLP (57) ABSTRACT

A piston adapted for use in offset mounting conditions includes a piston body having a longitudinally-extending axis. First and second securement features are located at radially outer positions relative to the axis. The first and second securement features are also located on one diametrical side of a midplane of the piston body. A plurality of support walls extends from the diametrically opposite side of the piston body toward the securement features. A gas spring assembly including such a piston is also included.

17 Claims, 5 Drawing Sheets

PISTON AND GAS SPRING ASSEMBLY INCLUDING SAME

This application claims priority from U.S. Provisional Patent Application No. 60/899,456 filed on Feb. 5, 2007, which is hereby incorporated herein by reference in its entirety.

BACKGROUND

The present novel concept broadly relates to fluid suspension systems and, more particularly, to a gas spring assembly having an improved piston construction adapted for use in offset mounting conditions.

It is to be specifically understood that the subject novel concept is capable of broad use in a wide variety of suitable applications and environments and can be used in association with gas spring assemblies of any suitable size, type and/or configuration without departing from the principles thereof.

One category of known gas spring assemblies, referred to in the art as rolling lobe-type gas springs, typically includes a top plate, a piston and a flexible sleeve secured therebetween. The flexible sleeve forms a lobe that rolls up and down an outer side wall of the piston in response to loads applied to the top plate and/or piston. In such assemblies, the piston is normally formed from either a metal material, typically steel, or a plastic material. Each construction has numerous benefits as well as some disadvantages, and the selection of one construction versus the other will vary from application-to-application.

Figure 1:
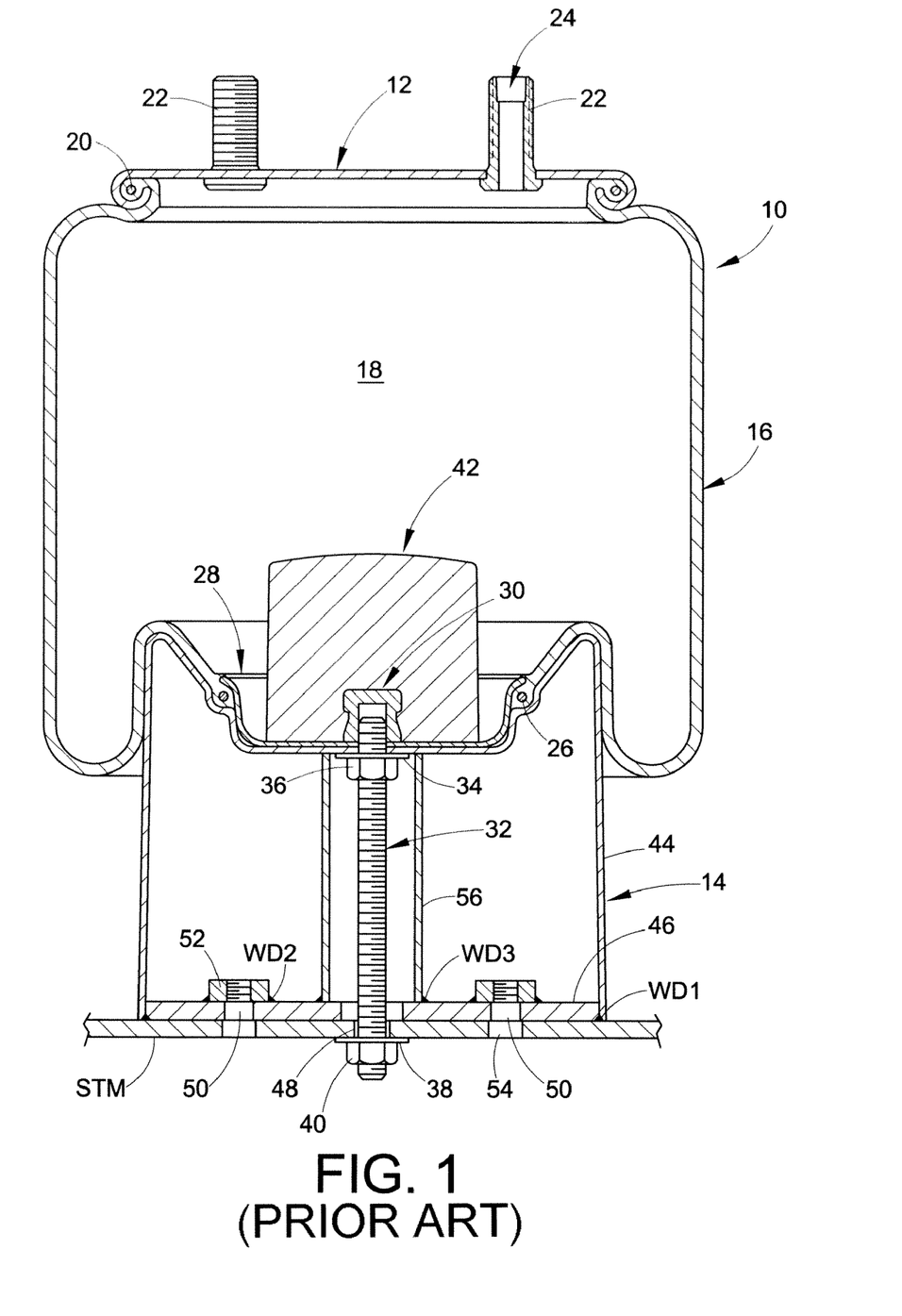
FIG. 1 is a cross-sectional side view of a gas spring assembly having a known metal piston.

FIG. 1 illustrates one example of a prior art gas spring 10 of a generally known construction secured along a structural member STM, such as a component of a vehicle, for example. Gas spring 10 includes a top or bead plate 12 and a piston 14 disposed in spaced relation thereto. A flexible sleeve 16 is secured between the bead plate and piston and generally defines a spring chamber 18 formed therebetween.

Flexible sleeve 16 includes an upper mounting bead 20 that is captured by bead plate 12 in a typical manner, such as by crimping the peripheral edge of the bead plate around the upper mounting bead. Upper mounting studs 22 are supported on bead plate 12 and project outwardly therefrom. A gas passage 24 extends through one of the upper mounting studs and is in fluid communication with spring chamber 18.

Flexible sleeve 16 also includes a lower mounting bead 26 that is secured on piston 14 using an end closure 28. A threaded bumper mount 30 receives a lower mounting stud 32 that extends through end closure 28, piston 14 and structural member STM. Threaded bumper mount 30 and end closure 28 are secured on the piston by a first washer 34 and threaded nut 36. Additionally, the gas spring assembly is secured to structural member STM using a second washer 38 and a second threaded nut 40. As lower mounting stud 32 is tensioned by the first threaded nut, bumper mount 30 secures end closure 28 on piston 14 thereby capturing and retaining lower mounting bead 26 of flexible sleeve 16. A jounce bumper 42 is shown as being secured on bumper mount 30 along end closure 28.

Piston 14 is exemplary of known steel piston constructions and includes an outer shell 44 along which flexible sleeve 16 is secured and rolls. A base plate 46 is received within a lower, open end of outer shell 44 and is typically secured therein by welding the base plate and outer shell together, as indicated by all-around weld WD1. A central mounting hole 48 extends through base plate 46 and lower mounting stud 32 extends therethrough. Outer mounting holes 50 are spaced radially outwardly from the central mounting hole and are suitable for receiving fasteners (not shown). Weld nuts 52 are secured, such as by welded joints WD2, on base plate 46 adjacent outer mounting holes 50. Additionally, structural member holes 54 are in alignment with the outer mounting holes and weld nuts for receiving a suitable fastener (not shown). A center column 56 extends between outer shell 44 and base plate 46 and is typically secured on the base plate by a welded joint WD3.

Figure 2:
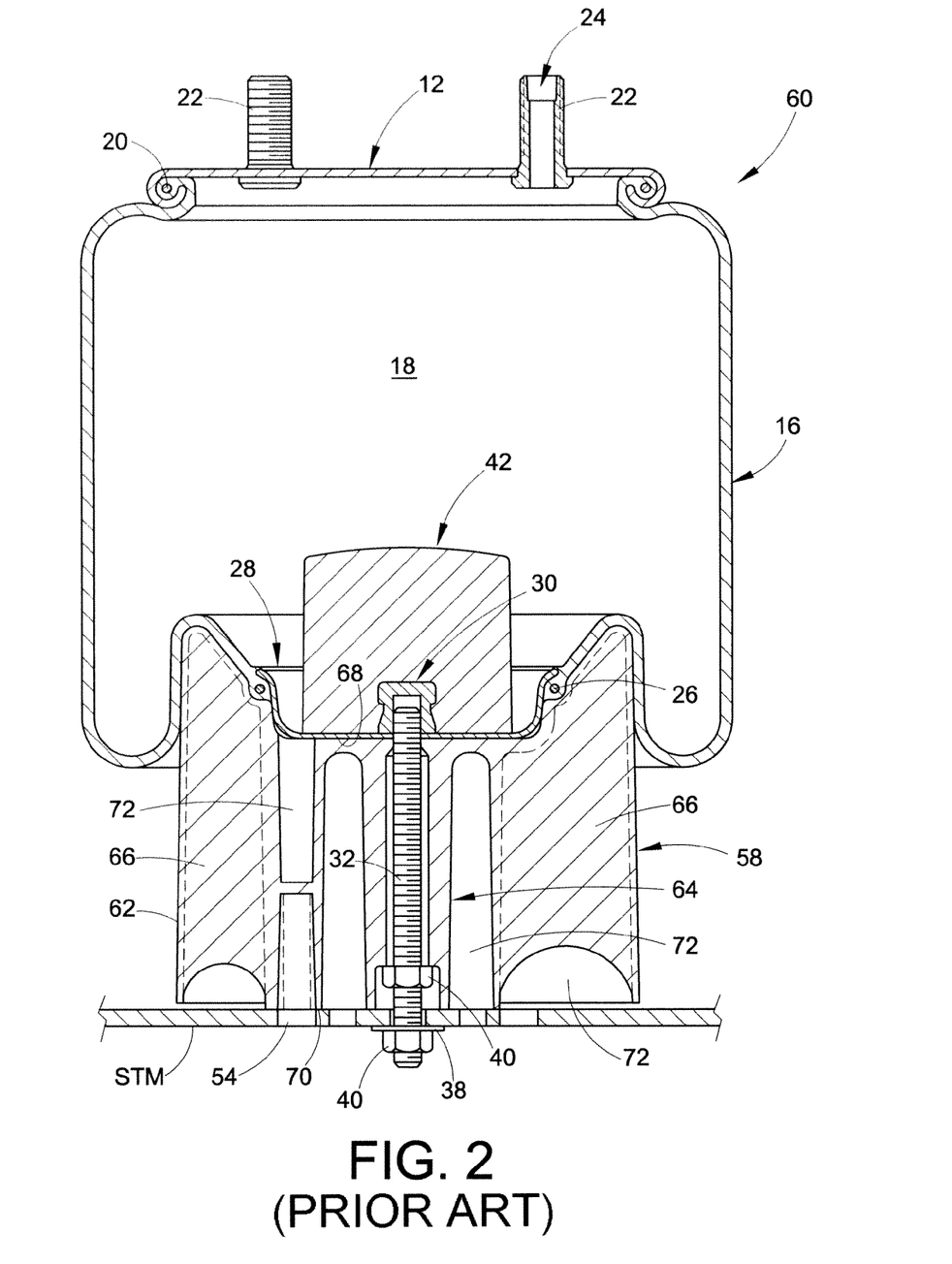
FIG. 2 is a cross-sectional side view of a gas spring assembly having a known plastic piston.

Another embodiment of a generally known construction is shown in FIG. 2 and has like items that will be shown and/or described using like reference characters. Additionally, new or modified features and/or components are shown and described using new reference characters. A primary difference between gas spring 10 shown in FIG. 1 and piston 58 of gas spring 60 shown in FIG. 2 is that piston 58 is molded from a plastic material. As such, piston 58 is typically a unitary construction formed from a single material. Piston 58 includes an outer shell portion 62 and an inner support portion 64. Outer shell portion 62 is interconnected with inner support portion 64 through a plurality of radial wall portions 66. Inner support portion 64 extends between an upper end wall 68 and a lower end wall 70. The upper end wall engages end closure 28 and the lower end wall is supported on a structural member STM.

As piston 58 is of a molded construction, it will be appreciated that typical molding conventions and techniques apply to the manufacture thereof and are used in forming piston 58. For example, it is desirable to maintain a substantially uniform wall thickness when an injection molding process is utilized. As such, piston 58 includes numerous cored areas 72 of a variety of shapes, sizes and configurations. Thus, certain limitations in the shape and/or configuration of piston 58 and the walls thereof may exist.

One benefit of producing a piston from plastic is that the piston can often be injection molded as a complete or nearly complete component as disclosed in commonly owned, co-pending U.S. application Ser. No. 11/398,835, filed 6 Apr. 2006, the entire disclosure of which is expressly incorporated herein by reference. As a result, costs associated with physically assembling the piston can be significantly reduced or eliminated. Additionally, it is well understood that gas springs are commonly exposed to harsh environments, such as in vehicle suspension applications in which water, dirt, salt and other materials are present. Another benefit is that pistons formed from a plastic material are often less susceptible to exposure of this kind.

A need exists in the industry to provide a piston for use in offset mounting arrangements. For example, it is sometimes desirable to position a gas spring on a vehicle in such as manner that the piston thereof is secured to a support arm in an offset mounting arrangement, such as to prevent the components of the gas spring from inadvertently contacting the tire. Known piston assemblies that are suitable for use in such offset mounting arrangements are generally heavy duty in order to handle the additional stresses imposed by the offset mounting condition. Consequently, a need exists for an offset mounting design that can still be manufactured as a lightweight composite material. Present composite piston designs are not adapted for offset use and, for example, often include a central support structure for securing the gas spring piston to a central mounting surface. Still other composite piston designs are used in conjunction with a metal mounting plate to allow for offset mounting.

Moreover, an offset mounting arrangement for a composite piston used with a gas spring assembly should preferably include the advantages of reduced weight, reduced number of components, simplified manufacturing process and cost improvements when compared to other offset piston designs.

Accordingly, an improved piston and gas spring assembly including the same have been developed that overcome these and other disadvantages.

BRIEF DESCRIPTION

A gas spring assembly according to the subject matter of the present disclosure is provided that is adapted for securement between first and second associated structural components of an associated vehicle. The gas spring assembly includes a spring sleeve having a longitudinal axis and including a flexible wall extending circumferentially about the longitudinal axis between opposing first and second ends. An end member is adapted for securement along the first associated structural component. The end member is secured along the first end of the flexible wall such that a substantially fluid-tight seal is formed therewith. A piston is adapted for securement in an offset mounting condition along the second associated structural component. The piston is disposed in longitudinally-spaced relation to the end member and includes opposing first and second piston ends. The piston also includes an outer side wall extending longitudinally between the first and second piston ends. The piston further includes first and second securement features and a plurality of support walls extending between the outer side wall and one of the first and second securement features. The first piston end is operatively connected to the second end of the flexible wall. The second piston end includes an end wall having a mounting section and an offset section. The mounting section is adapted to abuttingly engage the second associated structural component for securement of the piston thereon. Additionally, at least some of the offset section is disposed diametrically opposite the mounting section and in laterally-spaced relation to the second associated structural component along a distal portion of the piston. The first and second securement features are positioned on the piston such that the first and second securement features are accessible from along the mounting section. The plurality of support walls includes a first support wall and a second support wall. The first support wall extends between the distal portion of the piston and the first securement feature. The second support wall extends between the distal portion of the piston and the second securement feature.

A gas spring assembly according to the subject matter of the present disclosure is provided that includes a flexible wall extending between opposing first and second ends. A first end member is secured along the first end of the flexible wall such that a substantially fluid-tight seal is formed therewith. A second end member is disposed in longitudinally-spaced relation to the first end member and is operatively connected along the second end of the flexible wall. The second end member has a longitudinally-extending axis and includes an outer side wall extending circumferentially about the axis that at least partially defines a cavity within the second end member. The second end member also includes a longitudinally-extending midplane. A plurality of securement features is disposed along one side of the midplane. First and second support walls extend from a distal portion of the outer side wall, which is disposed on the other side of the midplane, to different ones of the plurality of securement features.

A gas spring composite piston according to the subject matter of the present disclosure is provided that includes a piston body having a longitudinally-extending central axis defining a centerline thereof. An outer side wall extends circumferentially about the axis, and first and second securement features are located at radially outer positions of the piston body. The first and second securement features are located on one diametrical side of the centerline of the piston body.

DETAILED DESCRIPTION

Figure 3:
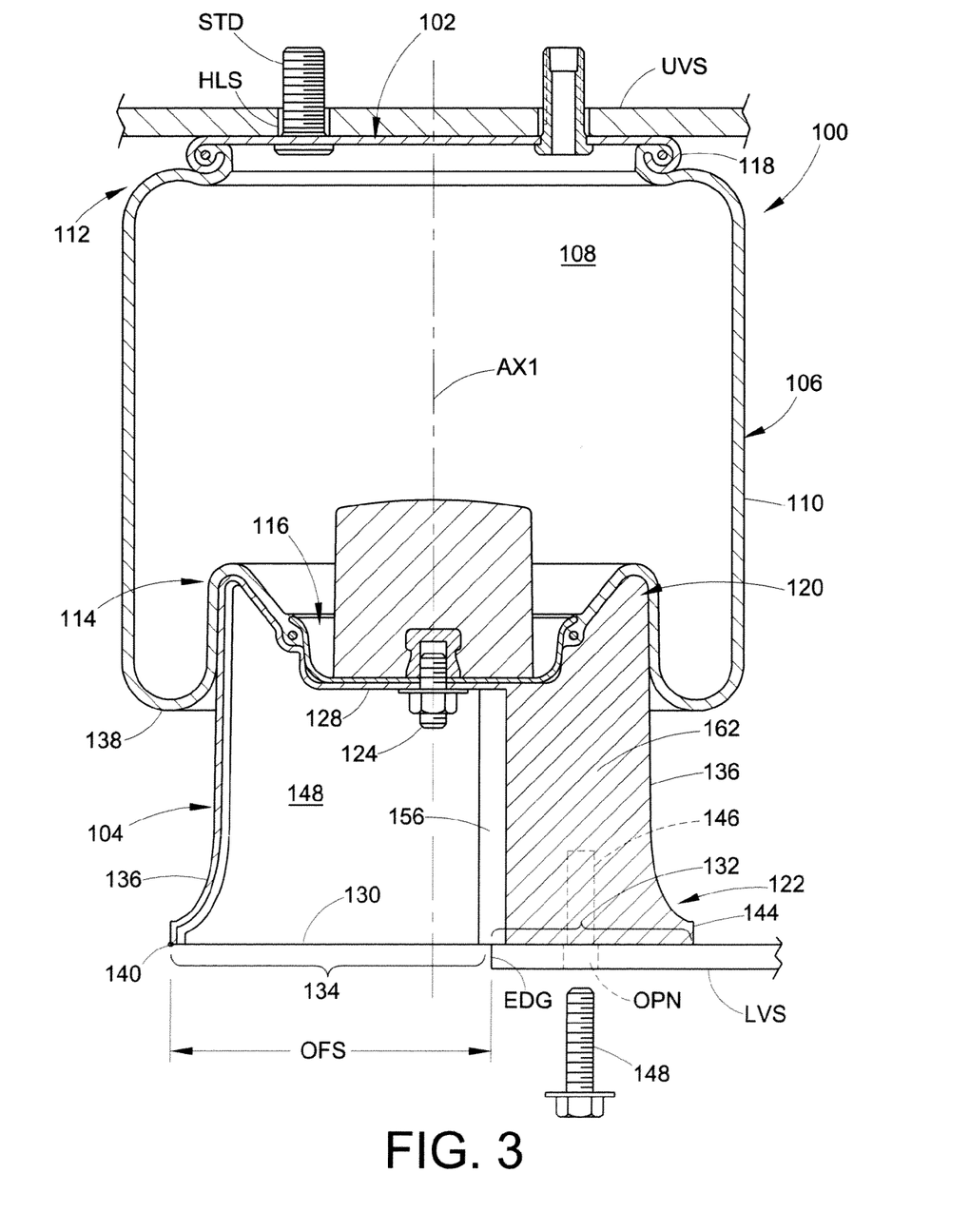
FIG. 3 is a side view of a gas spring assembly including a composite piston in accordance with the subject matter of the present disclosure shown installed on a support structure in an offset mounting condition.
Figure 4:
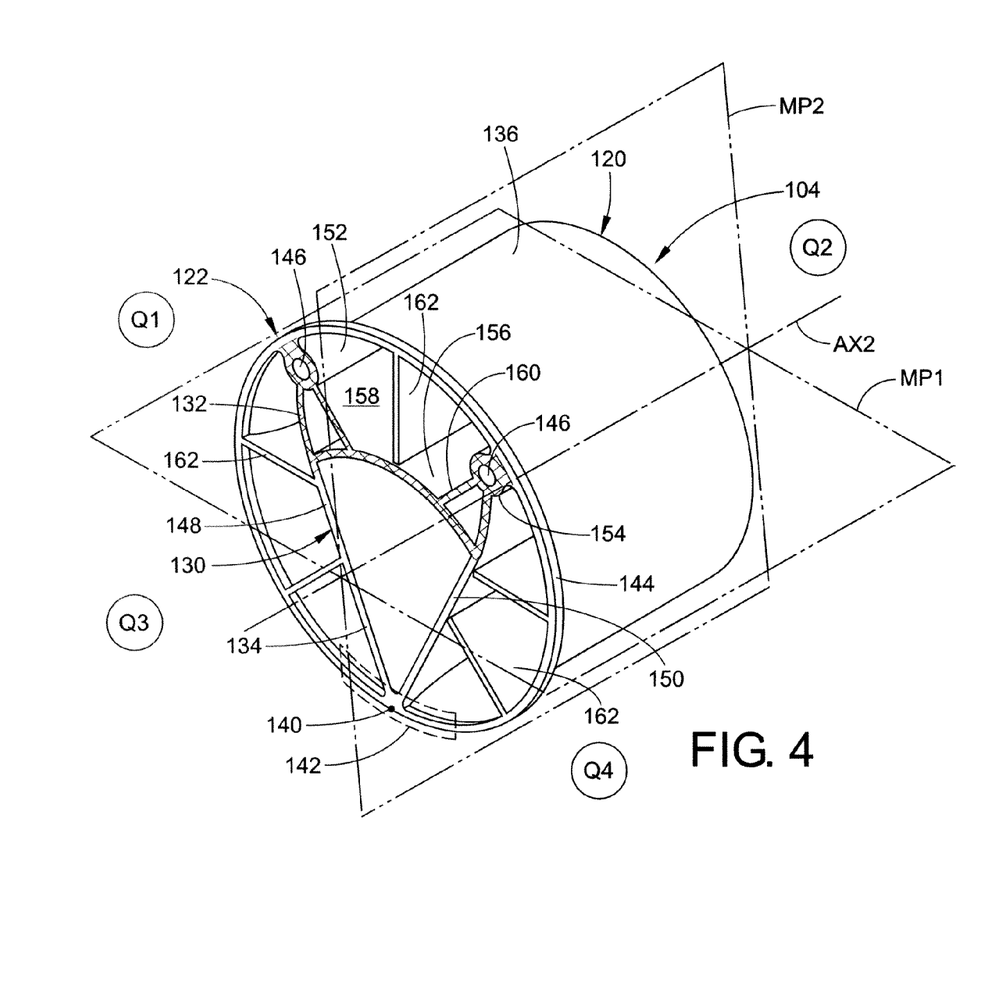
FIG. 4 is a bottom perspective view of the composite piston in FIG. 3.
Figure 5:
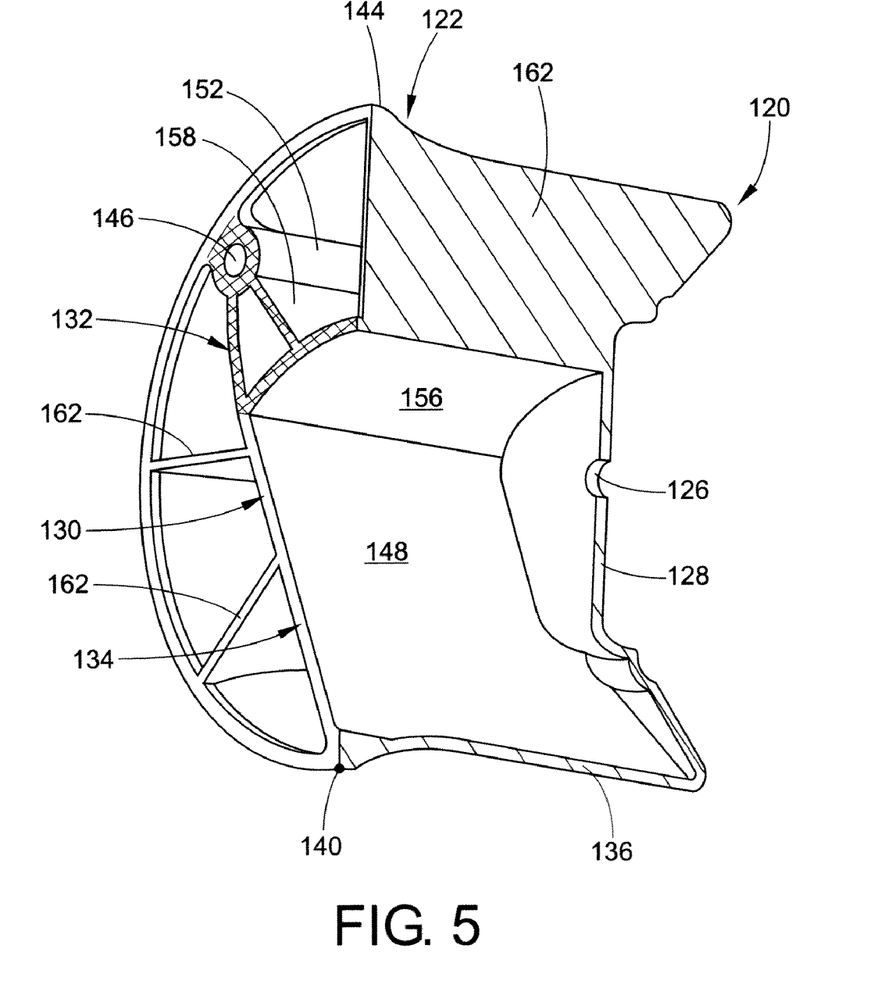
FIG. 5 is a bottom perspective view of the composite piston in FIG. 4 with selected portions cut away for ease of illustration.

Turning, now, to FIGS. 3-5, wherein the showings are for the purpose of illustrating an example of the subject matter of the present disclosure and not intended as a limitation of the same, FIG. 3 illustrates a gas spring assembly 100 disposed between opposing structural components, such as upper and lower vehicle structures UVS and LVS, for example. Gas spring assembly 100 is shown as having a longitudinal axis AX1 and includes a first end member, such as a top or bead plate 102, for example, that is adapted for securement on or along one of the structural components (e.g., upper vehicle structure UVS). It will be appreciated that the first end member can be secured along the structural component in any suitable manner, such as by using one or more threaded mounting studs STD extending through corresponding mounting holes HLS in the structural components, for example.

Gas spring 100 also includes an opposing second end member, such as a piston 104, for example, that is longitudinally spaced from the first end member and is adapted for offset mounting on or along a different one of the structural components, such as lower vehicle structure LVS, for example. Gas spring 100 also includes a spring sleeve or bellows that is disposed generally between the first and second end members and at least partially defines a spring chamber therebetween. In the exemplary arrangement FIG. 3, an elongated spring sleeve 106 is shown that extends between the first and second end members and at least partially defines a spring chamber 108 therebetween. Elongated spring sleeve 106 includes a flexible wall 110 that extends between opposing ends 112 and 114. It will be appreciated that the ends of the flexible wall can be secured on or along the corresponding end members in any manner suitable for forming a substantially fluid-tight seal therewith, such as by using an end closure 116 or a crimped edge connection 118, for example.

Piston 104 extends longitudinally between a first or upper end 120 and a second or lower end 122, and has a piston axis AX2 (FIG. 4) extending longitudinally therebetween. First end 120 of piston 104 is adapted to receive end 114 of flexible wall 110, which can be secured thereto in any suitable manner. As one example, end closure 116 can be secured on or along piston end 116 by using a fastener 124 (or other suitable securement device) extending at least partially through a hole or opening 126 (FIG. 5) formed through a first or upper end wall 128 of first end 120 of piston 104 to thereby capture an end portion of the flexible wall between the end closure and the piston. It will be appreciated, however, that any one of a variety of other arrangements could alternately be used.

Second or lower end 122 of piston 104 is disposed generally opposite spring sleeve 106 and includes a second or lower end wall 130 of which a first portion 132 is adapted to engage or otherwise abuttingly contact a structural component (e.g., lower vehicle structure LVS) with a remaining portion 134 being offset, cantilevered or otherwise extending in an unsupported manner laterally-outwardly beyond the structural component, as is shown in FIG. 3, for example. Additionally, piston 104 includes an outer side wall 136 that extends generally longitudinally between first and second ends 120 and 122. In use, flexible wall 110 of spring sleeve 106 forms a rolling-lobe 138 that is displaced along outer side wall 136 as the gas spring undergoes changes in overall height, such as, for example, may be due to variations in load conditions applied thereto, as is well understood by those of skill in the art.

As mentioned above, it can be recognized from FIG. 3 that gas spring assembly 100 is disposed along lower vehicle structure LVS using an offset mounting arrangement in which portion 134 of piston 104 is cantilevered laterally-outwardly from or otherwise unsupported by the lower vehicle structure. Additionally, it will be appreciated that any suitable distance or amount of offset can be used, as is represented by dimension OFS that extends from an edge or side wall EDG of lower vehicle structure LVS to an outermost lateral point 140 along a distal portion 142 (FIG. 4) of piston 104.

Said differently, piston 104 is shown in FIG. 4 as including longitudinally extending midplanes MP1 and MP2 that are disposed in alignment with axis AX2 and approximately transverse (e.g., perpendicular) to one another. Midplanes MP1 and MP2 each define opposing sides of piston 104, resulting in the establishment of quarters Q1-Q4 of the piston. As one exemplary description of piston 104, outer side wall 136 can extend approximately circumferentially about axis AX2, as is shown in FIG. 4, and can include an outermost peripheral extent or wall portion 144. In such case, distal portion 142 of piston 104 may be an arcuate section of side wall 136 and/or end wall 130 that is approximately diametrically opposite supported portion 132 of piston 104.

Piston 104 can be secured on or along the corresponding structural member (e.g., lower vehicle structure LVS) in any suitable manner, such as by including one or more securement features operatively provided thereon. For example, piston 104 is shown as including first and second securement holes or passages 146, such as, for example, may be suitable for receiving a fastener 148 or other securement component extending through a corresponding opening OPN in lower vehicle structure LVS. As indicated above, however, it is to be understood that any other suitable securement arrangement can alternately, or additionally, be used.

Turning, now, to the construction of a piston in accordance with the subject matter of the present disclosure, such as piston 104, for example, the same is preferably at least partially formed from a polymeric material, such as a high-strength or fiber-reinforced plastic, for example. Thus, such a piston may be capable of being formed as a single, unitary component, such as though the use of a suitable injection molding process, for example. As one example, piston 104 can be formed as a one-piece, unitary body and can have at least one open end, such as second end 122, as shown in FIGS. 3-5, for example. Optionally, threaded inserts (not shown) can be molded into the piston body to form suitable securement features and thereby enable the piston to be suitably secured, as discussed above.

As has been discussed above, a piston (e.g., piston 104) in accordance with the subject matter of the present disclosure is adapted for use in offset mounting arrangements. As such, it will be recognized that the one or more securement features (e.g., securement passages 146) provided on the piston is disposed toward one lateral extent of the piston. Thus, it will be appreciated that this portion of the piston may be of a more substantial construction to withstand the axial and moment load conditions that will be supported by this portion of the piston. It will also be recognized, however, that the piston will also be subjected to other load conditions applied on or along the outer side wall (e.g., outer side wall 136) and/or any unsupported portions (e.g., portion 134) of the piston. As such, one or more support walls can extend within the piston to provide radial rigidity and/or other structural support.

For example, piston 104 is shown in FIGS. 3-5 as including first and second support walls 148 and 150 extending from along distal portion 142 to bosses 152 and 154, which bosses respectively include securement passages 146. In one exemplary embodiment, the first and second support walls can extend from an approximately coincident point (e.g., outermost lateral point 140). Bosses 152 and 154 are disposed on one diametrical side of midplane MP1 and distal portion 142 is disposed on the opposing diametrical side of midplane MP1. As such, the first and second support walls extend laterally along piston 104. However, it will be recognized that bosses 152 and 154 are also disposed on opposing sides of midplane MP2 from one another. Accordingly, first and second support walls 148 and 150 extend from the distal portion at an included angle (not numbered) relative to one another forming a somewhat V-shaped configuration. A third support wall can optionally extend between the first and second support walls in spaced relation to both distal portion 142 and bosses 152 and 154 such that a cavity is formed between the first, second and third support walls. This results in a somewhat A-frame structure that extends internally through the piston and further assists with supporting the often significant load conditions that are commonly incurred by a piston that is not centrally supported. Fifth and sixth support walls 158 and 160 respectively extend from along bosses 152 and 154 to third support wall 156. Optionally, one or more additional support walls 162 can be disposed between outer side wall 136 and one of the first, second, third, fourth and/or fifth support walls.

This structure provides a reduction in weight and components when compared to other offset piston designs. Moreover, there is a simplified manufacturing process with resulting cost improvements since the composite piston can be molded in an injection process. Additionally, as used herein with reference to certain elements, components and/or structures (e.g., "first end member" and "second end member"), numerical ordinals merely denote different singles of a plurality and do not imply any order or sequence unless specifically defined by the claim language. Furthermore, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept.

Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly adapted for securement between first and second associated structural components of an associated vehicle, said gas spring assembly comprising:
    a spring sleeve having a longitudinal axis and including a flexible wall extending circumferentially about said longitudinal axis between opposing first and second ends;
    an end member adapted for securement along the first associated structural component, said end member secured along said first end of said flexible wall such that a substantially fluid-tight seal is formed therewith; and,
    a piston adapted for securement in an offset mounting condition along the second associated structural component, said piston disposed in longitudinally-spaced relation to said end member and including:
    opposing first and second piston ends, a midplane, an outer side wall extending longitudinally between said first and second piston ends, first and second securement features, and a plurality of support walls;
    said plurality of support walls including a first support wall extending between said outer side wall and said first securement feature, a second support wall extending between said outer side wall and said second securement feature, a third support wall extending between said first and second support walls, a fourth support wall extending between said outer side wall and said third support wall, a fifth support wall extending from said first securement feature to said third support wall, and a sixth support wall extending from said second securement feature to said third support wall;
    said first piston end operatively connected to said second end of said flexible wall;
    said second piston end including an end wall having a mounting section and an offset section, said mounting section adapted to abuttingly engage the second associated structural component for securement of said piston thereon, at least some of said offset section diametrically opposed from said mounting section and disposed in laterally-spaced relation to the second associated structural component along a distal portion of said piston;
    said first and second securement features positioned on said piston such that said first and second securement features are accessible from along said mounting section and such that said first and second securement features are disposed on opposing sides of said midplane; and,
    said first support wall extending from a distal point along said distal portion of said piston to said first securement feature, said second support wall extending from approximately said distal point along said distal portion of said piston to said second securement feature, said third support wall extending between and terminating at said first and second side walls, and said fourth support wall extending in approximate alignment with said midplane from a proximal point generally opposite said distal point and terminating at said third support wall.

2. A gas spring assembly according to claim 1, wherein said first and second securement features are disposed in spaced relation to one another, and said first and second support walls are disposed at an included angle from one another.

3. A gas spring assembly according to claim 2, wherein said third support wall extends between said first and second support walls in spaced relation to said distal portion of said piston and said first and second securement features such that a central opening is formed into said piston.

4. A gas spring assembly according to claim 1, wherein said first and second support walls extend from an approximately coincident end point along said distal portion of said piston.

5. A gas spring assembly according to claim 1, wherein said plurality of support walls at least partially defines a corresponding plurality of cavities within said piston, and at least a portion of said second end of said piston is open such that at least a portion of said plurality of cavities are exposed.

6. A gas spring assembly according to claim 1, wherein said first and second securement features include fastener-receiving holes extending longitudinally into said piston from along said end wall of said second end.

7. A gas spring assembly comprising:
    a flexible wall extending between opposing first and second ends;
    a first end member secured along said first end of said flexible wall such that a substantially fluid-tight seal is formed therewith; and,
    a second end member disposed in longitudinally-spaced relation to said first end member and operatively connected along said second end of said flexible wall, said second end member having a longitudinally-extending axis and including an outer side wall extending circumferentially about said axis and at least partially defining a cavity within said second end member, said second end member including a first longitudinally-extending midplane, a second longitudinally-extending midplane disposed transverse to said first midplane, a plurality of securement features disposed along one side of said first midplane and on opposing sides of said second midplane, first and second support walls extending from a distal portion of said outer side wall disposed on the other side of said first midplane and in approximate alignment with said second midplane to different ones of said plurality of securement features disposed on opposing sides of said second midplane, a third support wall extending between and terminating at said first and second support walls, a fourth support wall extending in approximate alignment with said second midplane from said outer side wall to said third support wall, and fifth and sixth support walls extending from different ones of said plurality of securement features to said third support wall along opposing sides of said second midplane.

8. A gas spring assembly according to claim 7, wherein said second end member is formed from a polymeric material.

9. A gas spring assembly according to claim 8, wherein said second end member includes threaded metal inserts disposed within said polymeric material to at least partially form said plurality of securement features.

10. A gas spring assembly according to claim 7, wherein said first and second end walls extend at a non-zero angle to one another from an approximately coincident point along said outer side wall such that said first, second and third walls form an A-shaped configuration.

11. A gas spring assembly according to claim 7, wherein said second end member includes a plurality of bosses with said plurality of securement features formed on respective ones of said plurality of bosses.

12. A gas spring assembly according to claim 11, wherein said first and second support walls extend into different ones of said plurality of bosses.

13. A gas spring composite piston comprising:
a piston body having a longitudinally-extending central axis defining a centerline thereof and a midplane extending through said piston body along said central axis;
an outer side wall extending circumferentially about said axis;
first and second securement features located at radially outer positions along said outer side wall, said first and second securement features located on one diametrical side of said centerline of said piston body; and,
a plurality of support walls extending within said outer side wall and at least partially forming a plurality of cavities within said piston body, said plurality of side walls including first, second, third, fourth, fifth and sixth support walls, said first and second support walls extending from a common point along said outer side wall to respective ones of said first and second securement features, said common point disposed opposite said first and second securement features and in approximate alignment with said midplane, said third support wall extending between and terminating at said first and second support walls, said fourth support wall extending in approximate alignment with said midplane from a point opposite said common point to said third support wall, and said fifth and sixth support walls extending from different ones of said first and second securement features to said third support wall along opposing sides of said midplane.

14. A gas spring composite piston according to claim 13, wherein said first and second support walls extend at a non-zero angle relative to one another from an approximately coincident point along said outer side wall.

15. A gas spring composite piston according to claim 13, wherein said piston body includes first and second bosses disposed on opposing sides of said midplane with said first support wall terminating at said first boss and said second support wall terminating at said second boss.

16. A gas spring composite piston according to claim 15, wherein said first and second securement features are respectively disposed along said first and second bosses.

17. A gas spring composite piston according to claim 16, wherein said first and second securement features each include a plurality of metal threads extending into respective ones of said first and second bosses in an approximately longitudinal direction.

* * * * *